(12) United States Patent
Prescott et al.

(10) Patent No.: US 7,261,228 B2
(45) Date of Patent: Aug. 28, 2007

(54) VEHICLE HITCH RACK

(75) Inventors: Keith Prescott, Cambridge, VT (US);
Jean Pigeon, Granby (CA); Moussa
Zahzam, Granby (CA); Hugues
Espesset, Montréal (CA); Germain
Dépot, St-Denis de Brompton (CA);
Stéphane Labrie, St-Alphonse de
Granby (CA); Laurent Landrin,
Granby (CA); Alain Parizeau,
Saint-Basile le Grand (CA)

(73) Assignee: Sportrack Accessories, Granby (CA)

( * ) Notice: Subject to any disclaimer, the term of this patent is extended or adjusted under 35 U.S.C. 154(b) by 492 days.

(21) Appl. No.: 10/833,265

(22) Filed: Apr. 28, 2004

(65) Prior Publication Data
US 2005/0035168 A1 Feb. 17, 2005

(51) Int. Cl.
B60R 9/00 (2006.01)
B60R 11/00 (2006.01)

(52) U.S. Cl. ...................... 224/502; 224/509; 224/519; 224/924

(58) Field of Classification Search ................ 224/924, 224/521, 519, 532, 536, 917.5, 497, 282, 224/502, 531, 553; 280/769
See application file for complete search history.

(56) References Cited

U.S. PATENT DOCUMENTS 4,400,129 A * 8/1983 Eisenberg et al. .......... 414/462
5,094,373 A * 3/1992 Lovci .......................... 224/509
5,181,822 A * 1/1993 Allsop et al. ............... 414/462
5,373,978 A * 12/1994 Buttchen et al. ............ 224/510
5,443,189 A * 8/1995 Hirschfeld .................. 224/501
5,449,101 A 9/1995 Van Dusen
5,469,998 A 11/1995 Van Dusen et al.
5,489,110 A * 2/1996 Van Dusen ............... 280/415.1
5,685,686 A * 11/1997 Burns ......................... 414/462
5,845,831 A 12/1998 Nusbaum et al.
5,938,093 A * 8/1999 Bloemer et al. ............ 224/553
6,164,508 A * 12/2000 van Veenen ................ 224/509
6,431,423 B1 8/2002 Allen et al.
6,516,986 B1 * 2/2003 Lassanske et al. .......... 224/533
6,655,562 B2 * 12/2003 Jeong ......................... 224/282

* cited by examiner

Primary Examiner—Nathan J. Newhouse
Assistant Examiner—Corey N. Skurdal
(74) Attorney, Agent, or Firm—Ogilvy Renault LLP

(57) ABSTRACT

A sporting article transport rack that is engageable to a hitch of an automotive vehicle is provided. The rack comprises a hitch engaging portion that is fastenable to the hitch and which extends therefrom away from the automotive vehicle. An elongated stem portion extends upwardly from the hitch engaging portion. An article support member is securable to an upper end of the elongated stem portion and is cantilevered therefrom. The article support member is removable from the elongated stem portion.

19 Claims, 5 Drawing Sheets

VEHICLE HITCH RACK

TECHNICAL FIELD

The present invention relates generally to a rack assembly for carrying recreational sporting equipment on a vehicle, and more particularly relates to such a rack for mounting on a rear hitch of a vehicle.

BACKGROUND OF THE INVENTION

Popular recreational sporting activities, such as biking or skiing, often require equipment which must be transported with the user but which cannot easily be stored within automotive vehicles. Accordingly, various vehicle racks which accommodate bicycles and other such large recreational sporting equipment are generally well known. One such type of vehicle-mountable rack is commonly known as a hitch rack, in which the rack assembly is mountable to a rear hitch-mount of the vehicle. This type of rack is often used for bicycles, such that one or more transversely mounted bicycles can be carried adjacent the rear of the vehicle.

While such hitch-mounted racks are known, there exists drawbacks with the use of this type of rack assembly. When the rack is installed on the hitch-mount at the rear of the vehicle, the vertically extending rack and the equipment carried thereon can impede access to the rear of the vehicle. Accordingly, many attempts have been made to provide a rear-mounted vehicle hitch rack which can be tilted away from the vehicle, such that the user can more easily gain access to the rear of the vehicle. However, the known release mechanisms used to permit this displacement of the upstanding rack portion are generally inconvenient or difficult to use. For example, it is known to employ a removable pin at the base of the rack, to retain the upstanding rack portion fixed relative to the hitch-mount engaging portion of the rack. When the pin is removed, the upstanding rack portion may be swung away from the rear of the vehicle. This type of release mechanism is disadvantageous as the user must bend down to gain access to the pin, and replacement of the pin can be difficult. Further, loss of the pin remains possible, which renders the rack ineffective. The pin can also be difficult to re-engage when the rack is loaded with the weight of the bicycles or other recreational equipment.

While foot-operated release mechanisms for rear-mounted vehicle racks are known, such as disclosed by Van Dusen in U.S. Pat. Nos. 5,449,101 and 5,489,110 issued Sep. 12, 1995 and Feb. 6, 1996 respectively, they can be difficult to easily operate, often requiring the user to operate a small lever on the rack latch with one foot, maintain balance with the other foot, and control the downward movement of the rack and its contents with both free hands. As the rack can be used to carry several objects which may represent a significant total weight, the known foot-operated rack release mechanisms require considerable skill and strength to operate. Further, the stops provided to limit downward travel of the rack tend to bend the rack support arm if a loaded rack is released from the vertical transportation position without being restrained and guided downwardly by the user.

Further disadvantages also exist with rear-mounted vehicle hitch racks. These racks generally have an object carrying arm which rearwardly extends from the vertical support post of the upstanding rack portion. In order to be able to accommodate several objects, such as several bicycles for example, this rearwardly projecting arm of the rack can protrude needlessly a considerable distance out from the rear of the vehicle when the rack is not being used to carry objects. As most hitch racks are rigid assemblies, the rearwardly projecting portion always extends its full length out from the vehicle. Some hitch-mounted racks do permit the rearwardly projecting arms to pivot downwards, in a plane generally parallel to a longitudinal axis of the vertical support post of the upstanding rack portion, in order to solve this problem. However, this solution limits the type and number of attachments which can be used on the rearwardly projecting arms which carry the recreational equipment, thereby limiting the variety of carrying configurations possible.

Additionally, rear hitch-mounted racks also present difficulties when used to carry bicycles. The rearwarly projecting arm of this type of rack is usually configured to receive and engage the top tube of a bicycle. Typically, straps or clamps of some sort are used to fasten the bicycle top tube onto the rack. However, an insufficiently secure clamping mechanism can cause normal operation of the vehicle to result in misalignment or swaying of the bicycles on the rack. To prevent this, it is known to employ a rotational anti-sway arm, which engages another tube of the bicycle frame in order to limit unwanted movement of the bicycle on the rack during vehicle movement. U.S. Pat. No. 6,431,423 issued Aug. 13, 2002 to Allen et al., for example, discloses such a rotational anti-sway arm which is pivotable about the rearwardly extending bicycle support arm. While such a pivoting anti-sway arm does reduce unwanted movement of the bicycles carried by the rack, the rotational movement of the anti-sway stabilizing arm can interfere with many bicycle frame configurations.

Accordingly, there exists a need for a hitch-mounted vehicle rack which addresses the above-noted deficiencies of known hitch-mounted vehicle racks.

SUMMARY OF THE INVENTION

It is an object of the present invention to provide a vehicle hitch-mounted rack having an improved tilt mechanism actuated by a foot operated release pedal.

It is another object of the present invention to provide a vehicle hitch-mounted rack having an object carrying member which is selectively removable.

It is another object of the present invention to provide a vehicle hitch-mounted rack having an object carrying member that this selectively orientable to limit unnecessary projections from the rear of the vehicle when the rack is not in use.

It is yet another object of the present invention to provide a vehicle hitch-mounted rack having an anti-sway member which accommodates most bicycle frame configurations.

Therefore, in accordance with the present invention, there is provided a sporting article transport rack engageable to a hitch of an automotive vehicle, the rack comprising: a hitch engaging portion fastenable to said hitch and extending therefrom away from said automotive vehicle; an elongated stem portion extending upwardly from said hitch engaging portion; and an article support member securable to an upper end of said elongated stem portion and being cantilevered therefrom, said article support member being removable from said elongated stem portion.

There is also provided, in accordance with the present invention, a sporting article transport rack engageable to a hitch of an automotive vehicle, the rack comprising: a hitch engaging portion fastenable to said hitch and extending therefrom away from said automotive vehicle; an elongated stem portion extending upwardly from said hitch engaging portion; and an article support member securable to an upper end of said elongated stem portion and being cantilevered therefrom, said article support member being orientable in a plane substantially normal to a longitudinal axis of said elongated stem portion.

There is further provided, in accordance with the present invention, a sporting article transport rack engageable to an automotive vehicle, the rack comprising: a vehicle engaging portion fastenable to said automotive vehicle; an article supporting member connected to said vehicle engaging portion, and having a securing element for engagement of a sporting article, said securing element including a load-carrying fixed support portion; and a selectively positionable stabilizing portion having an article engaging member displaceable relative to said fixed support portion by a variable distance and cooperable therewith for retaining said sporting article in a stable position on said rack There is additionally provided, in accordance with the present invention, a sporting article transport rack engageable to a hitch of an automotive vehicle, the rack comprising: a hitch engaging member fastenable to said hitch and extending therefrom away from said automotive vehicle; an elongated stem member pivotably engaged at a first end thereof to said hitch engaging member and upwardly extending therefrom, said elongated stem member being selectively displaceable between an upright transportation position and an inclined vehicle access position; an article support member provided at a second end of said elongated stem member and being cantilevered therefrom; and a latch assembly including a latch member biased to retain said elongated stem member in said upright transport position and being releasable by a foot actuable release mechanism, said latch assembly comprising a guide pin received within a guide slot for constrained relative movement therewith, said guide slot defining an integrally formed stop at one end thereof for limiting travel of said guide pin, and thereby limiting travel of said elongated stem member when displaced into said inclined vehicle access position.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

The sporting article transport rack of the present invention is preferably adapted to be installed to a rear hitch of an automotive vehicle such as a car or truck. It is to be understood, however, that such a hitch-type mount can be similarly mounted to the front of such a vehicle. Further, the term hitch as used herein is intended to comprise the mounting bracketry conventionally fastened to the vehicle, and which is used to receive a typical tow-ball type hitch attachment. The hitch rack of the present invention is generally adapted for installation in place of such a standard tow-ball or other equivalent arrangements which are typically employed with a standard vehicle hitch. Sporting article transport racks which cooperate with vehicle hitches generally comprise a support structure which is cantilevered from the hitch and upwardly extending therefrom, and are most commonly used to suspend one or more bicycles at the rear of the vehicle. While the vehicle hitch rack of the present invention will generally be described with particular reference to its use for supporting and transporting bicycles, it is to be understood that it can similarly be used to transport any other relatively large sporting equipment article which can not readily fit within the vehicle. Although preferably adapted for engagement to a vehicle hitch, the rack assembly of the present invention can be alternately mounted to the automotive vehicle, with some minor modifications which will be evident to one skilled in the art. For example, one or more elongated stem portion, to which the sporting article supporting member is secured, of the present invention can be engaged to a vehicle engaging portion which is fastenable to the automotive vehicle at a point thereon other than the hitch. Particularly, such an alternate vehicle engaging portion is fastened using straps and other typical retention methods to the rear trunk, tailgate or hatch of the vehicle. Further, although perhaps less practical, the elongated stem portion could be upstanding from a modified roof rack, adapted for being mounted to the roof of a automotive vehicle.

Figure 1:
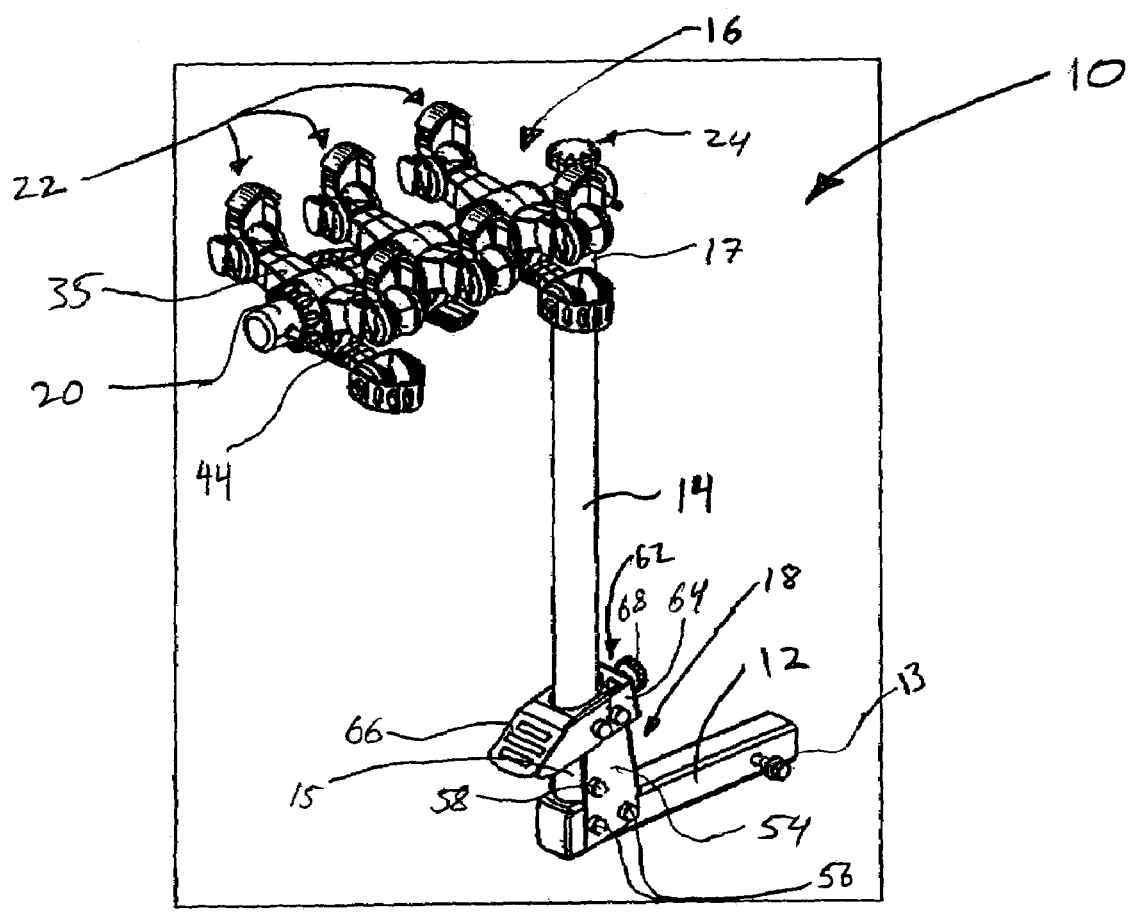
FIG. 1 is a perspective view of a hitch rack according to a preferred embodiment of the present invention, shown in an upright transportation position.

Referring to FIG. 1, the hitch rack assembly 10, which is preferably adapted for transporting bicycles, generally includes a hitch engaging member 12, at least one upwardly extending elongated stem member 14 pivotably mounted at a first lower end 15 thereof to the substantially horizontal hitch engaging member 12 by a pivoting assembly 18, and an article support member assembly 16 secured to a second upper end of the elongated stem member 14. The hitch engaging member 12 preferably comprises a hitch mount square tube which is adapted to be received within a typical vehicle hitch and can be retained in place therewithin by a fastener 13, such as a bolt or locking pin, or any other equivalent fastening means. Although a single elongated stem member 14 is preferably used, it is similarly possible to employ two or more such upwardly extending elongated stem members. The elongated stem member 14 preferably comprises a hollow cylindrical tube and is generally vertically oriented, substantially perpendicular to the hitch mount member 12, when the rack is in an upright transport position. As mentioned above, the elongated stem member 14 is preferably pivotably engaged to the hitch engaging member 12, which permits the elongated stem member 14, and the article support member assembly 16 fixed thereto, to be tilted away from the vehicle when desired in order to permit improved access to the trunk or rear gate of the vehicle. Particularly, the elongated stem member 14 is selectively displaceable between the upright transport position and a fully inclined vehicle access position. A latching assembly which normally retains the rack in the upright transport position and a foot operated release mechanism which permits the rack to tilt away from the vehicle, are also provided and will be described in further detail below. Therefore the rack tilting feature ensures that easy access to the rear of the vehicle is possible, without having to remove the sporting articles from the rack.

The first lower end 15 of the elongated stem member 14 is preferably pivotably engaged with the horizontal hitch engaging member 12 by the pivoting assembly 18. As best seen is FIGS. 3a to 3c, a U-shaped base bracket 54 has opposed upstanding plates fastened to either side of the horizontal hitch engaging member 12 by fasteners 56, which can be pins, rivets, bolts or any other suitable fastener. The first lower end 15 of the elongated stem member 14 fits within the open end of the U-shaped base bracket 54 and is pivotably engaged to the opposed upstanding plates thereof via pivot axle 58, which extends through corresponding apertures in the opposed upstanding plates of the base bracket 54 and the first lower end 15 of the elongated stem member 14. Accordingly, the elongated stem member 14 can pivot about the pivot axle 58 in a direction generally defined by arc 60 in FIG. 3a. The elongated stem member 14 and, thus, the object support member assembly 16, can therefore be downwardly tilted in order to allow improved access to the gate, trunk or rear door of the vehicle without the entire hitch rack assembly 10 having to be disconnected from the hitch of the vehicle.

Figure 3C:
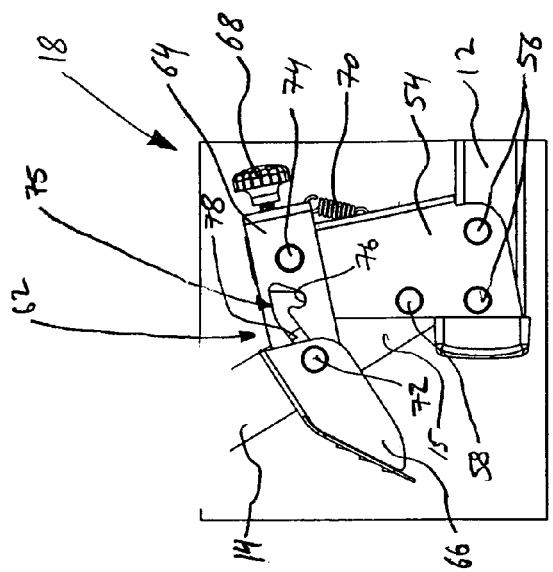
FIG. 3c is a side elevation view of the foot of the hitch rack as shown in FIG. 2.
Figure 3B:
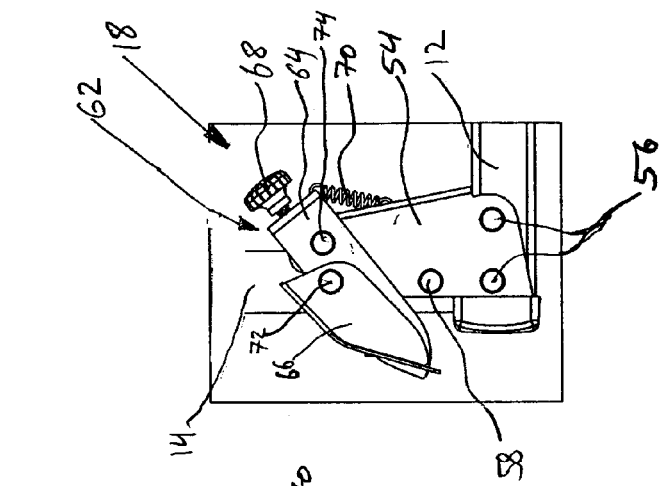
FIG. 3b is a side elevation view of the foot of the hitch rack as shown in FIG. 1, with the foot pedal depressed to activate the release latch.
Figure 3A:
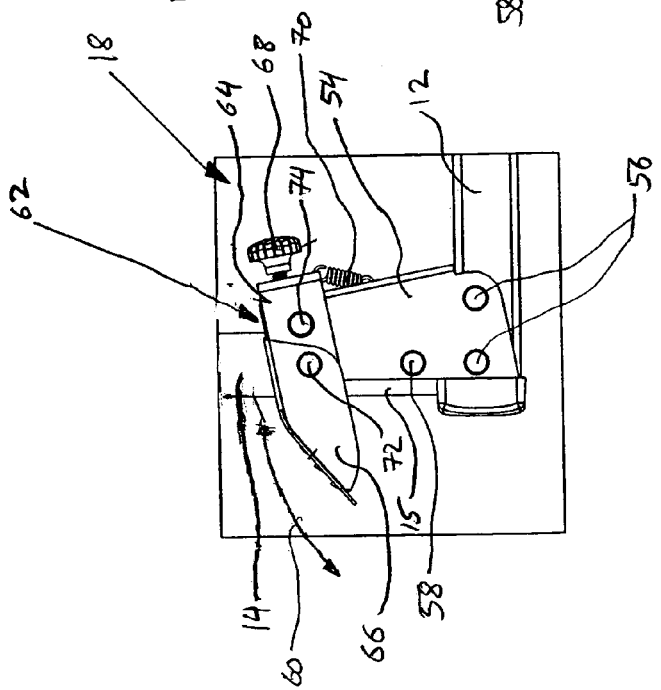
FIG. 3a is a side elevation view of the foot of the hitch rack as shown in FIG. 1.

FIG. 3a depicts the elongated stem member 14 in its upright transport position and FIG. 3c depicts the elongated stem member 14 in its fully inclined vehicle access position. Release mechanism 62 permits disengagement of the latch assembly, such that the elongated stem member 14 can be inclined away from the vehicle. The latch assembly generally comprises a latch member 64 pivotable on the opposed upstanding plates of the base bracket 54 via a latch pivot pin 74. The release mechanism 62 includes a latch member actuating pedal 66 adapted to be operated by the foot of a user. The pedal 66 is independently pivotable about pedal pivot pin 72, which extends through corresponding apertures in the pedal 66 and the elongated stem member 14. The pedal pivot pin 72 also extends through a slot 75 formed in the latch member 64, and serves as a guide pin for displacement of the elongated stem member 14. The slot 75 comprises an latching portion 76 which receives the pedal pivot pin 72 when the elongated stem member 14 is in its upright transport position, and a guide portion 78 which guides the pedal pivot pin 72, and therefore the elongated stem member 14 through which it is engaged, during the displacement of the rack into the fully inclined vehicle access position. The guide portion 78 of the slot 75 therefore provides a stop, integral with the latch member 64, to limit travel of the elongated stem member 14 when the pedal pivot pin 72 reaches the end of the slot guide portion 78. A helical tension spring 70 is fixed at a first lower end thereof to the base bracket 54 and at a second opposed upper end to the forward end of the latch member 64. This therefore helps retain the latch member 64 in a pedal pin retaining position, which ensures that the elongated stem member 14 is normally maintained substantially vertically in the upright transport position, unless the latch member 64 is depressed by the pedal 66 to permit the release and tilting of the elongated stem member 14. A safety locking screw 68 extends through a threaded aperture in a rear portion of the latch member 64, through a slot in the base bracket 54, and frictionally engages the elongated stem member 14. Accordingly, with the safety locking screw 68 tightened, pivotal displacement of the latch member 64 relative to the base bracket 54 is prevented. Further, tightening of the safety locking screw 68 forces the pedal pivot pin 72 firmly against the edges of the slot 75 within the upper latching portion 76, thereby ensuring that all slack is taken out of the pivoting assembly 18 and the release mechanism 62.

Figure 2:
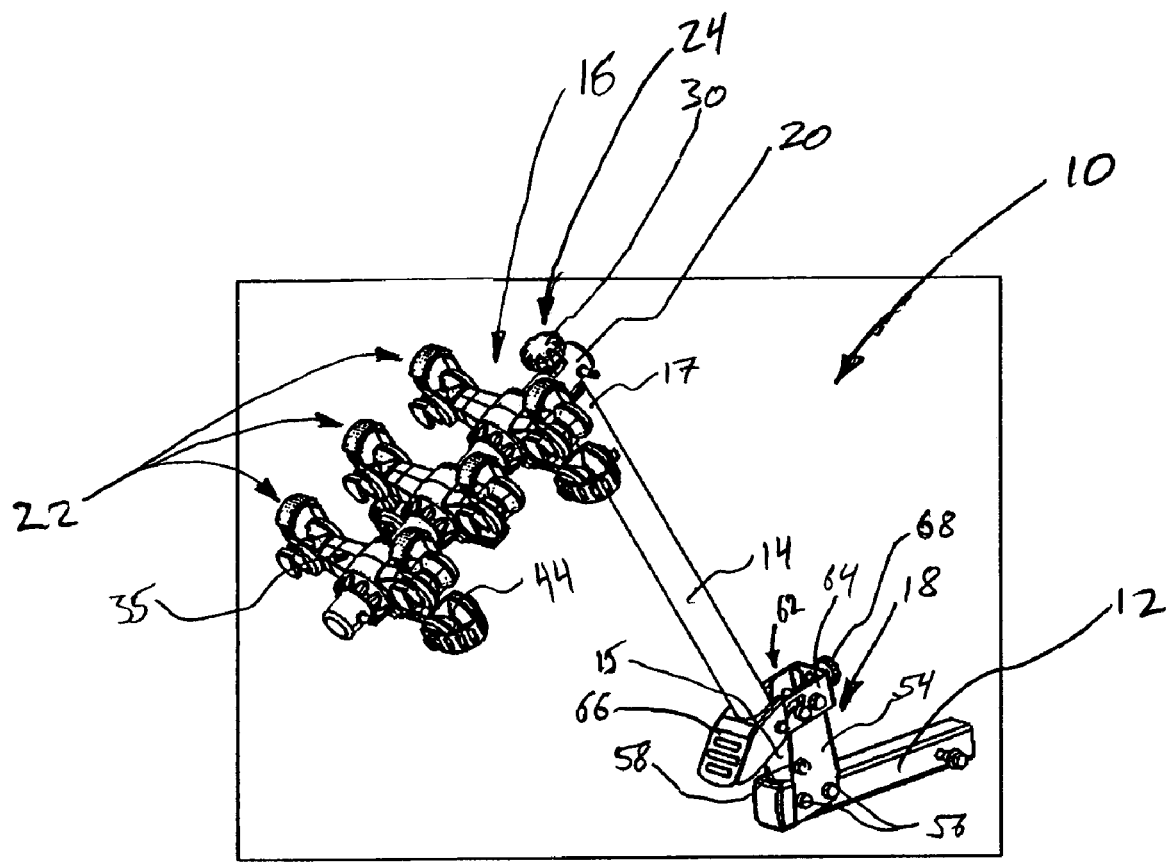
FIG. 2 is a perspective view of the hitch rack of FIG. 1, shown in an inclined vehicle access position.

For a user to tilt the rack away from the vehicle in order to gain better access to the rear thereof, the safety locking screw 68 is first unscrewed. Pedal 68, which is discrete from the latch member 64 and spans both sides of the elongated stem member 14 in order to provide a relatively large and flat area for the user's foot, can be depressed by the user, thereby forcing the latch member 64 to pivot downwardly against the bias provided by the helical tension spring 70, as depicted in FIG. 3b. Once the latch member 64 has been sufficiently pivoted to permit the pedal pivot pin 72 to slide out from the latching portion 76 of the slot 75, the elongated stem member 14, and accordingly the article support member assembly 16 fixed to the upper end thereof, can be displaced into the fully inclined vehicle access position as depicted in FIGS. 2 and 3c. As the pedal pivot pin 72 slides within the slot 75 integrally provided in the latch member 64, it serves as the guide pin for the displacement of the elongated stem member 14. As travel of the elongated stem member 14 is limited by the pedal pivot pin 72 as it reaches the end of the guide portion 78 of the slot 75, no further external or discrete stop is required to limit travel of the elongated stem member 14 when the rack is tilted.

Although the elongated stem member 14 and the hitch engaging member 12 are preferably pivotably engaged as described above, it is to be understood that these members can similarly be integral portions of a single-piece formed structure. Particularly, such that a horizontal hitch engaging portion 12 is integral with, and fixed to, an elongated stem portion 14 substantially vertically extending therefrom. In such a case, no relative pivotable movement of the hitch engaging portion 12 and the elongated stem portion 14 is provided.

As noted above with reference to FIG. 1, the hitch rack assembly 10 comprises an article support member assembly 16, which is preferably removably secured to a second upper end of the elongated stem member 14. The article support portions of most hitch racks of the prior art are integrally formed with the upstanding support post. The entire article support member assembly 16 of the present hitch rack can be removed, as shown in FIG. 4a, from the rest of the hitch rack assembly 10. This accordingly permits the portion of the hitch rack assembly 10 which projects the furthest from the vehicle, namely the rearwardly extending article support member assembly 16, to be selectively removed when not in use. As the rest of the hitch rack assembly 10 remains installed in place on the vehicle, thus avoiding the relatively time-consuming task of unfastening the hitch engaging member 12 from the hitch of the vehicle, the rack can be quickly and easily converted from an operable configuration to a partially disassembled, space-saving configuration when the rack is not loaded with sporting articles. Further, the ability to partially disassemble the rack, by removing the article support member 16 from the elongated stem member 14 when the rack is not installed on a vehicle, also permits simplified storage or transportation of the rack, as the disassembled hitch rack assembly 10 takes up significantly less space than a conventional one-piece hitch rack.

Referring to FIG. 4a, the article support member assembly 16 generally comprises a support tube 20 which, when the article support member assembly 16 is engaged with the elongated stem member 14, is cantilevered therefrom and generally lies in a plane which is substantially normal to a longitudinal axis of the elongated stem member 14. To the support tube 20 is fastened at least one securing element 22 which is adapted for the support and engagement of a sporting article, such as a bicycle. Preferably, several such bicycle securing elements 22 are provided on the support tube 20 of the article support member assembly 16. Although the number of bicycle securing elements 22, and therefore the number of bicycles which can be accommodated on the hitch rack assembly 10, is limited by the length of the support tube 20 and the total weight which the hitch rack assembly 10 can support, two to four such bicycle securing elements 22 are preferably provided. FIG. 4a shows two bicycle securing elements 22 employed, and FIG. 1 depicts three bicycle securing elements 22 in place on the support tube 20. As will be described in further detail below with reference to FIG. 5, each bicycle securing element 22 comprises a fixed, load-carrying support portion 35 and also preferably includes a selectively positionable stabilizing portion 44.

Figure 4B:
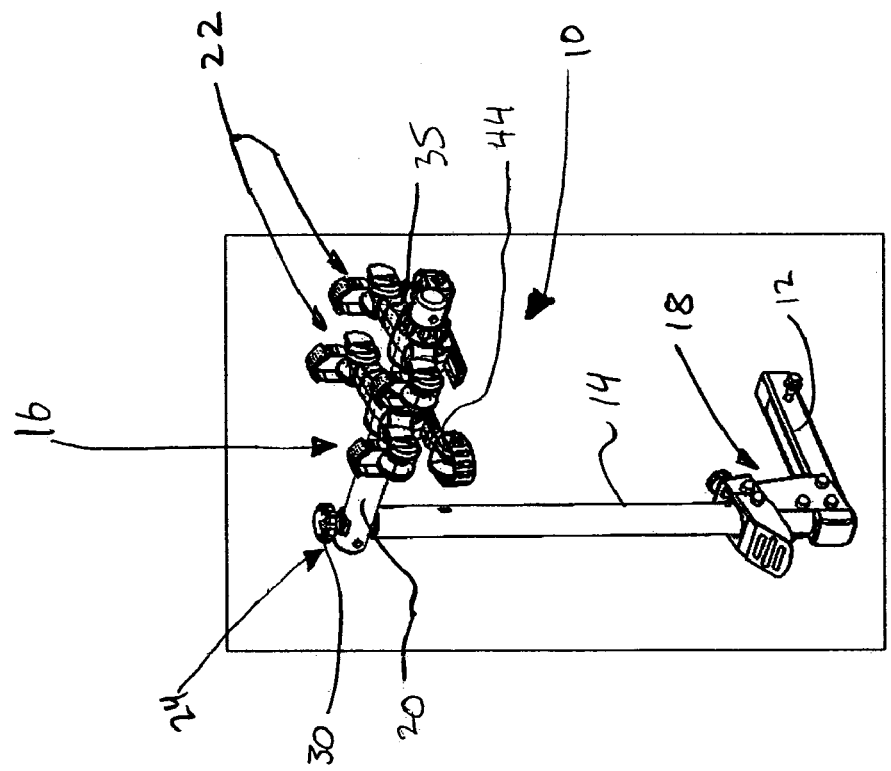
FIG. 4b is a perspective view of the hitch rack of FIG. 4a, shown with the object support member engaged in an alternative orientation.
Figure 4C:
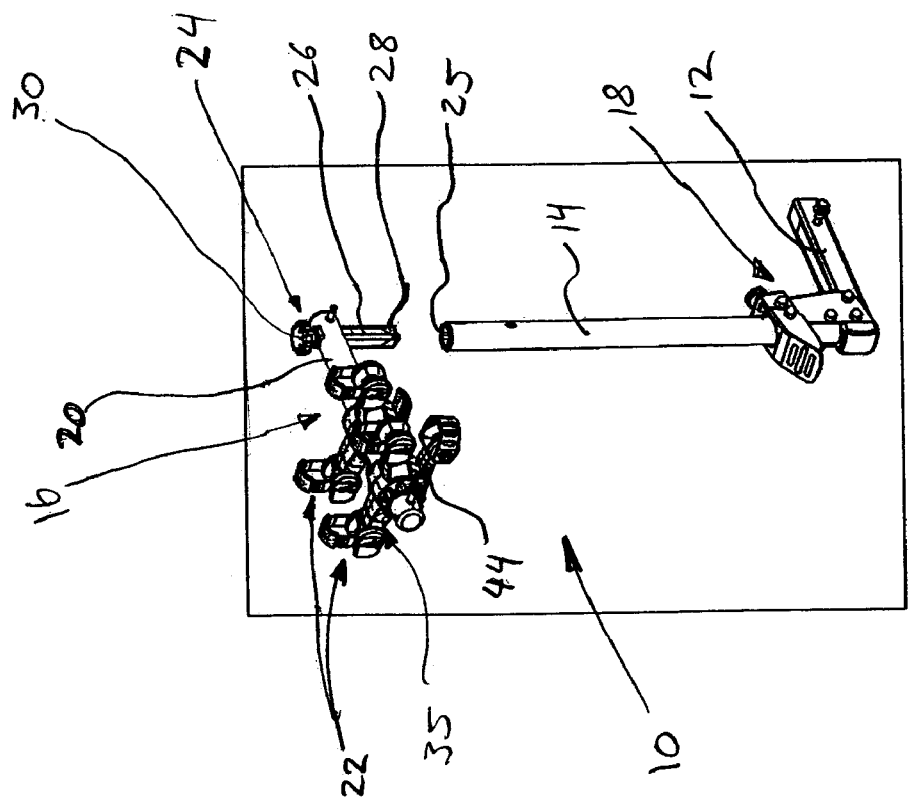
FIG. 4a is a perspective view of the hitch rack according to a preferred embodiment of the present invention, shown with the object support member removed.

Rather than completely removing the article support member assembly 16 as described above when the rack is not carrying bicycles, it can alternately, once disengaged from the elongated stem member 14, be repositioned in an alternate orientation. For example, as depicted in FIG. 4b, the article support member assembly 16 can be removed and subsequently re-engaged with the elongated stem member 14 such that it extends transversely relative to the direction of travel of the vehicle, rather than being completely removed from the elongated stem member 14. Alternately, if the cross-sectional shape of the post 26 is circular rather than square, as will be described in further detail below, the article support member assembly 16 can be rotated in place about the longitudinal axis of the elongated stem member 14, without having to fully remove the article support member assembly 16 from the elongated stem member 14. This enables the article support member assembly 16 to be rotated sideways such that it does not protrude unnecessarily from the vehicle when it is not carrying sporting articles, without having to completely remove and store the article support member assembly 16. Preferably, several pre-selected angular positions of the article support member assembly 16 relative to the upstanding elongated stem member 14 are provided, however in all cases the support tube 20 remains in a plane substantially normal to the longitudinal axis of the elongated stem member 14 as it is oriented thereabout.

The article support member assembly 16 is easily securable to the elongated stem member 14 by a fastening mechanism 24. The fastening mechanism 24 includes a post 26 having a central axis substantially normal to the plane defined by the support tube 20 and which is received within the upper open end 25 of the elongated stem member 14. Preferably, the post 26 has a square cross-sectional area, which mates with a correspondingly shaped insert fixed within the upper open end 25 of the elongated stem member 14. Although a standard circular cross-sectioned post can alternately be used, as indicated above, a square shaped cross-section of the post 26 is preferred and permits the article support member assembly 16 to be positionable on the elongated stem member 14 and orientable in one of four fixed orientations defined by the four sides of the post 26. This ensures that unwanted angular play of the support tube 20 about the longitudinal axis of the elongated stem member 14 is limited. In order to retain the post 26 within the elongated stem member 14, the fastening mechanism 24 comprises a laterally displaceable post end wedge 28. The post end wedge 28 has a cross-section corresponding to that of the remainder of the post 26 such that it can fit within the upper open end 25 of the elongated stem member 14, however mates with the base of the post 26 in a plane angularly positioned relative to the longitudinal axis of the post 26. The post end wedge 28 is engaged by a threaded screw, which extends within the hollow post 26 and through the support tube 20 to the fastening mechanism engagement knob 30. Accordingly, by tightening the fastening mechanism engagement knob 30, the post end wedge 28 is pulled upwardly towards the support tube 20. However, due to the angular wedge mating surface between the post 26 and the post end wedge 28, the post end wedge 28 is forced laterally within the elongated stem member 14. This lateral force of the post end wedge 28 acting on the inner walls of the elongated stem member 14 prevents unwanted removal of the post 26 therefrom when the fastening mechanism engagement knob 30 is tightened. Accordingly, by simply unscrewing the fastening mechanism engagement knob 30, the user can disengage the fastening mechanism 24, permitting the removal of article support member 16 from the elongated stem member 14.

Figure 5:
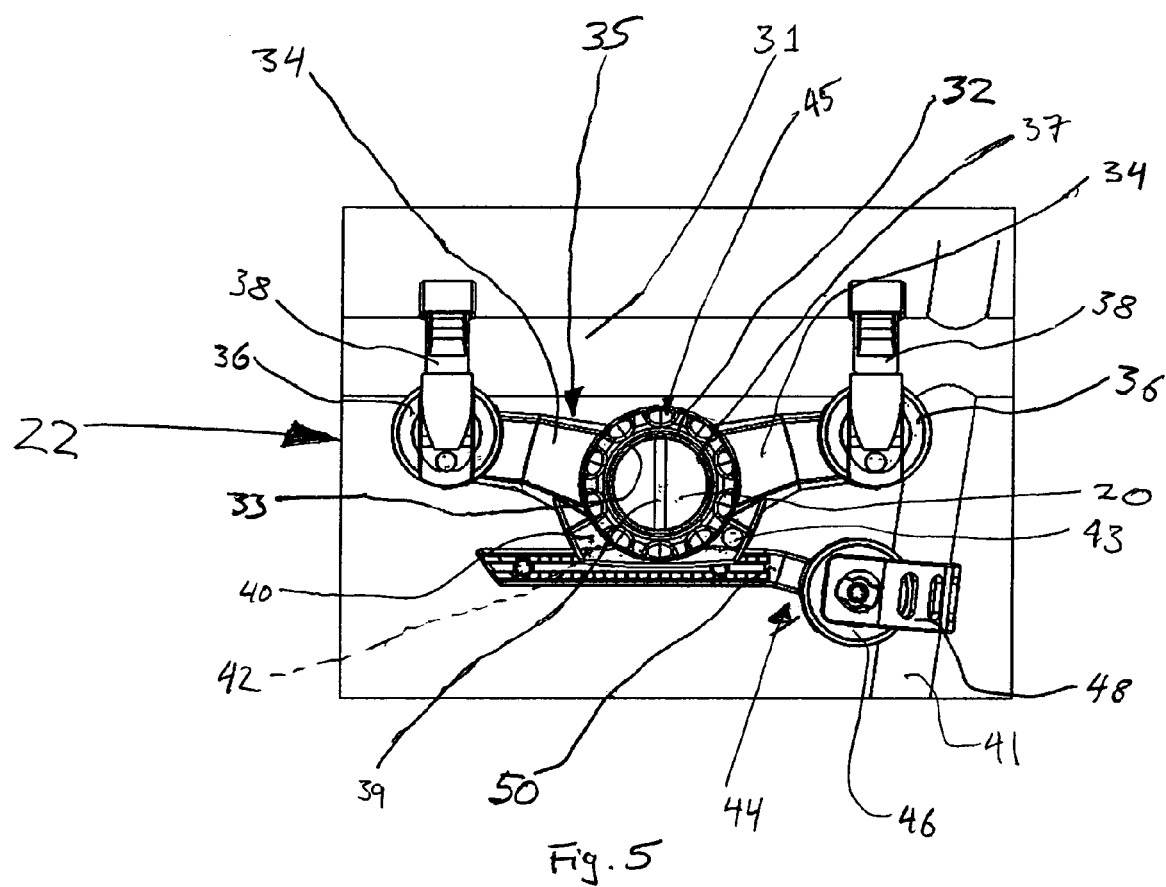
FIG. 5 is a side elevation view of a bicycle securing element of the hitch rack of FIG. 1.

Referring now to FIG. 5 depicting one of the bicycle securing elements 22, which is fastened to the support tube 20 of the article support member 16. As noted above, each bicycle securing element 22, which is adapted for the support and engagement of one bicycle, comprises a fixed load-carrying support portion 35 and preferably also includes a selectively positionable stabilizing portion 44. The load-carrying support portion 35 generally includes an annular central body 32 having an aperture 33 extending therethrough. Outwardly extending arms 34 project from opposed sides of the annular central body 32, and include bicycle supporting elements 36 at the ends thereof. The bicycle supporting elements 36 are preferably shaped to received a bicycle frame top tube 31 therein, and made of a relatively soft material such as rubber which will help grip the bicycle frame and prevent damage thereto. Retention straps 38 are fixed to the bicycle supporting elements 36 and are provided to fasten the bicycle in place on the load-carrying support portion 35 of the bicycle securing element 22.

The annular central body 32 of the load-carrying support portion 35 is engageable with the support tube 20 such that the load-carrying support portion 35, and therefore the bicycle fastened thereto, can be fixed at any selected angle relative to a longitudinal axis of the support tube 20. Particularly, a threaded sleeve 37 is fitted over the support tube 20 and is fixed in place thereon by a pin 39. The aperture 33 of the annular central body 32 is sized such that the annular central body 32 can be slid over the threaded sleeve 37, and fixed in place thereon, both axially and angularly, by a locking ring 45 which is threaded onto the threaded sleeve 37. Accordingly, the annular central body 32 of the load-carrying portion 35 can be rotated about the support tube 20 until a desired angular orientation is reached. Tightening of the locking ring 45 then fixes the load-carrying portion 35 in place.

The base of the load-carrying portion 35 comprises a lower body portion 40 having a slot 42 running the transverse length of the lower body portion 40 and opening downward, away from the bicycle frame top tube 31. The selectively positionable stabilizing portion 44, which acts as an anti-sway member for a bicycle fastened to the bicycle securing element 22, is linearly displaceable within the transversely extending slot 42 of the lower body portion 40.

The anti-sway stabilizing portion 44 comprises an arm 50 having serrations thereon, which slides within the slot 42. One end of the arm 50 has a third bicycle frame engaging element 46 fixed thereto. The bicycle frame engaging element 46 is adapted to engage the bicycle frame at another point, such as the seat tube 41 as depicted in FIG. 5, and is strapped thereto using a retention strap 48. This therefore provides a third attachment point for the bicycle fastened to the bicycle securing element 22, such that unwanted sway of the bicycle is further prevented. An outwardly biased push-button 43, provided in the lower body portion 40, includes teeth on an inner surface thereof which engage the serrations on the arm 50 of the anti-sway stabilizing portion 44. When the release push-button 43 is depressed by a user, the teeth are disengaged from the serrations of the arm 50, thereby permitting the arm 50 to be linearly displaced within the slot 42. With the push-button 43 pressed, the anti-sway stabilizing portion 44 can therefore be slid transversely relative to a direction of vehicle travel until the bicycle frame engaging member 46 is forced into engagement with the bicycle tube 41. Release of the push-button 43 locks the linearly displaceable stabilizing portion 44 in place, such that further transverse or fore-aft swinging movement of the bicycle relative to the fixed load-carrying support portion 35 is prevented. Accordingly, the selectively positionable stabilizing portion 44 is displaceable relative to said fixed support portion 35 by a variable distance. Therefore, although the selectively positionable stabilizing portion 44 is preferably translatable, and more particularly linearly translatable, in a preferred embodiment of the present invention, it is to be understood that alternate means of permitting the bicycle frame engaging member 46 to be displaceable by a variable distance relative to the fixed support portion 35 are similarly possible. For example, a rotatable stabilizing portion pivotable about the fixed support 35 and having a telescopic or otherwise extendable arm, can similarly be used to produce such a variable relative distance adjustment between the frame engaging member of the selectively positionable stabilizing portion and the fixed support portion.

The anti-sway stabilizing portion 44 can be linearly displaced the full length of the arm 50, thereby permitting significant adjustability such that a variety of different bicycle frame types and sizes can be accommodated, without having to displace the bicycle frame top tube 31 on the supporting members 36 of the fixed load-carrying support portion 35. This ensures that the bicycle frame can be maintained in a central position relative to the entire hitch rack assembly 10, such that a centralized center of gravity can be maintained. If required, the anti-sway stabilizing portion 44 can be completely removed from the bicycle securing element 22, by depressing push-button 43 and sliding arm 50 completely out of slot 42. Further, the anti-sway stabilizing portion 44 can be replaced in the opposite direction within the slot 42, such that the bicycle frame engaging member 46 can be fastened to another bicycle frame tube if necessary.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A sporting article transport rack engageable to a hitch of an automotive vehicle, the rack comprising:
 a hitch engaging portion fastenable to said hitch and extending therefrom away from said automotive vehicle;
 at least one elongated stem portion extending upwardly from said hitch engaging portion; said elongated stem portion being pivotably engaged to said hitch engaging portion, such that said elongated stem portion is selectively displaceable between an upright transport position and an inclined vehicle access position;
 an article support member securable to an upper end of said elongated stem portion and being cantilevered therefrom, said article support member being removable from said elongated stem portion;
 a latch member biased to retain said elongated stem portion in said upright transport position; and
 a foot actuable release mechanism for disengaging said elongated stem portion from said latch member, such that said elongated stem portion is permitted to move to said inclined vehicle access position, said release mechanism comprising a foot pedal pivotably engaged to said elongated stem portion about a guide pin, said latch member being pivotably mounted to said hitch engaging portion and comprising a guide slot defined therein for receiving said guide pin, and wherein said guide slot defines an integrally formed stop at one end thereof for limiting travel of said guide pin, thereby limiting travel of said elongated stem portion when displaced into said inclined vehicle access position.

2. The rack as defined in claim 1, wherein said article supporting member comprises a bicycle securing element for engagement of a bicycle thereto.

3. The rack as defined in claim 2, wherein said bicycle securing element includes a load-carrying fixed support portion and a selectively positionable stabilizing portion linearly displaceable relative to said fixed support portion.

4. A sporting article transport rack engageable to a hitch of an automotive vehicle, the rack comprising:
 a hitch engaging portion fastenable to said hitch and extending therefrom away from said automotive vehicle;
 at least one elongated stem portion extending upwardly from said hitch engaging portion, wherein said elongated stem portion is pivotably engaged to said hitch engaging portion, such that said elongated stem portion is selectively displaceable between an upright transport position and an inclined vehicle access position;
 an article support member securable to an upper end of said elongated stem portion and being cantilevered therefrom, said article support member being orientable in a plane substantially normal to a longitudinal axis of said elongated stem portion;
 a latch member biased to retain said elongated stem portion in said upright transport position; and
 a foot actuable release mechanism for disengaging said elongated stem portion from said latch member, such that said elongated stem portion is permitted to move to said inclined vehicle access position; said release mechanism comprising a foot pedal pivotably engaged to said elongated stem portion about a guide pin, said latch member being pivotably mounted to said hitch engaging portion and comprising a guide slot defined therein for receiving said guide pin, and wherein said guide slot defines an integrally formed stop at one end thereof for limiting travel of said guide pin, thereby limiting travel of said elongated stem portion when displaced into said inclined vehicle access position.

5. The rack as defined in claim 4, wherein said upper end of said elongated stem portion defines an aperture therein for mating engagement with a descending post of said article support member, said post having an axis collinear with said longitudinal axis of said elongated stem portion.

6. The rack as defined in claim 5, wherein said article support member is selectively positionable in one of at least two preset angular orientations within said plane.

7. The rack as defined in claim 6, wherein said post defines a square cross-sectional area, and said aperture in said second end of said elongated stem portion is correspondingly shaped to receive said post.

8. The rack as defined in claim 7, wherein said article support member is positionable in a transversely extending orientation relative to a direction of travel of said automotive vehicle.

9. The rack as defined in claim 4, wherein said article supporting member comprises a bicycle securing element for engagement of a bicycle thereto.

10. The rack as defined in claim 9, wherein said bicycle securing element includes a load-carrying fixed support portion and a selectively positionable stabilizing portion linearly displaceable relative to said fixed support portion.

11. A sporting article transport rack engageable to a hitch of an automotive vehicle, the rack comprising:
- a hitch engaging member fastenable to said hitch and extending therefrom away from said automotive vehicle;
- at least one elongated stem member pivotably engaged at a first end thereof to said hitch engaging member and upwardly extending therefrom, said elongated stem member being selectively displaceable between an upright transportation position and an inclined vehicle access position;
- an article support member provided at a second end of said elongated stem member and being cantilevered therefrom; and
- a latch assembly including a latch member biased to retain said elongated stem member in said upright transport position and being releasable by a foot actuable release mechanism, said latch assembly comprising a guide pin received within a guide slot for constrained relative movement therewith, said guide slot defining an integrally formed stop at one end thereof for limiting travel of said guide pin, and thereby limiting travel of said elongated stem member when displaced into said inclined vehicle access position.

12. The rack as defined in claim 11, wherein said article supporting member comprises a bicycle securing element for engagement of a bicycle thereto.

13. The rack as defined in claim 12, wherein said bicycle securing element includes a load-carrying fixed support portion and a selectively positionable stabilizing portion linearly displaceable relative to said fixed support portion.

14. The rack as defined in claim 13, wherein said selectively positionable stabilizing portion is linearly displaceable in a direction transverse to a direction of travel of said automotive vehicle.

15. The rack as defined in claim 13, wherein said selectively positionable stabilizing portion is removable from said securing element.

16. The rack as defined in claim 11, wherein said article support member is removable from said elongated stem member.

17. The rack as defined in claim 11, wherein said article support member is rotatable about a longitudinal axis of said elongated stem member in a plane substantially normal thereto.

18. The rack as defined in claim 17, wherein said article support member is selectively positionable in one of at least two preset angular orientations within said plane.

19. The rack as defined in claim 17, wherein said article support member is positionable in a transversely extending orientation relative to a direction of travel of said automotive vehicle.

* * * * *